United States Patent [19]

Berube

[11] 4,165,050

[45] Aug. 21, 1979

[54] REEL HOLDING HUB ASSEMBLY

[75] Inventor: Richard G. Berube, Marlboro, Mass.

[73] Assignee: King Instrument Corporation, Westboro, Mass.

[21] Appl. No.: 888,182

[22] Filed: Mar. 20, 1978

[51] Int. Cl.² .................................. B65H 19/02
[52] U.S. Cl. .............................. 242/68.3; 242/72.1
[58] Field of Search ............... 242/68.3, 72.1; 279/2 R; 269/46.1

[56] References Cited

U.S. PATENT DOCUMENTS

| 3,124,319 | 3/1964 | Cohen et al. | 242/68.3 |
| 3,272,450 | 9/1966 | Pendleton | 242/68.3 |
| 3,345,012 | 10/1967 | Ek | 242/68.3 |
| 3,833,181 | 9/1974 | Watkins | 242/68.3 |
| 3,850,382 | 11/1974 | Clingerman et al. | 242/68.3 |

Primary Examiner—Harvey C. Hornsby
Assistant Examiner—John M. Jillions
Attorney, Agent, or Firm—Schiller & Pandiscio

[57] ABSTRACT

The invention is a new hub assembly for mounting magnetic tape supply reels for rotation on a selected axis, e.g. in a tape cassette loading machine. The hub assembly comprises a hub adapted to be mounted on a selected axis, a clamping element in the form of a resilient ring on the periphery of the hub, and camming means and cam followers for expanding the resilient ring outwardly of the periphery of the hub so that the hub can exert pressure on a reel mounted on the hub.

12 Claims, 3 Drawing Figures

REEL HOLDING HUB ASSEMBLY

This invention relates to mounting devices, and more particularly to an improved hub assembly for mounting magnetic tape supply reels and the like for rotation on a selected axis. The invention is particularly adapted to mount tape supply reels for accummulating or paying-off a supply of magnetic tape in a tape cassette loading machine, but also may be used in other tape handling machines, such as tape duplicators.

A number of machines have been designed for loading magnetic tape cassettes with blank or with pre-recorded tape. As exemplified by U.S. Pat. Nos. 3,717,314 and 3,917,184, a tape cassette generally comprises a cassette case having two rotatable spools or hubs mounted in the case. A leader is attached to each spool or hub, and a predetermined length of magnetic tape is spliced, by its ends, to two leaders. In the manufacture of such cassettes, one common practice is to start with an empty cassette consisting of a cassette case with two hubs and a length of leader tape having one end connected to one hub and the other end connected to the other hub. The leader tape is cut to form two discrete leaders, the magnetic tape to be wound onto the cassette is then spliced to one leader, and the hub to which the one leader is connected is rotated to wind up a predetermined length of magnetic tape from a reeled supply of tape. The magnetic tape is then severed from the supply and the trailing end of the severed length of tape is spliced to the leader on the other hub. It is also a common practice to start with the two hubs each having a short leader, splice magnetic tape from a reeled supply to the leader on one hub, wind a predetermined amount of tape on the one hub, sever the tape from the supply, splice the trailing end of the severed tape to the leader on the other hub, and then mount the two hubs on a cassette case.

A typical cassette loading machine (see U.S. Pat. No. 3,637,153 issued to James L. King on Jan. 25, 1972 and U.S. Pat. No. 3,825,461 issued to Robert H. Gorman on July 23, 1974) comprises a splicing head assembly, splicing tape mechanism and a cassette holder which is adapted to hold a cassette which is to be filled with a magnetic recording tape. The machine also includes a rotatable shaft upon which is fixed a hub. The latter is adapted to support a tape supply reel upon which is wound a supply of magnetic tape for filling the cassettes. In order to minimize friction the tape supply typically is wound on the reel in the form of a flat, self-supporting pancake. The tape supply reel is releasably attached to the supporting hub by a suitable mechanical locking means. Among the different types of means which have been proposed by the art for locking a reel to a hub or shaft are various forms of cammed locking mechanisms such as the ones illustrated in FIGS. 6–9 of U.S. Pat. No. 3,783,200 issued Jan. 1, 1974 to Johannes K. Jantzen and Robert L. Moore, and in FIGS. 21 and 22 of U.S. Pat. No. 2,941,738 issued June 21, 1960 to Thomas U. Burke, Frederick G. Hughes and Thomas L. Vinson.

A limiting factor in the use of cassette-loading machines, tape duplicators, and the like is machine down-time for removal and replacement of tape supply reels when the tape supply thereon becomes exhausted. Also, when using a tape supply in the form of a flat pancake, the supply tape occasionally may become jammed between its supporting reel and the machine hub. Such jamming increases machine down-time and also results in increased manufacturing cost due to loss of tape. Other problems with prior locking type reel-supporting hubs are relatively high cost, unreliable reel locking, complicated structure, and excess weight or size.

It is thus a primary object of the present invention to provide a novel and an improved form of hub assembly for mounting a reel on a selected axis.

Another object of the present invention is to provide a novel and improved hub assembly for rotatably mounting magnetic tape supply reels in a tape cassette loading machine, tape duplicator and the like, and which overcomes or substantially reduces problems inherent with prior art devices.

A more specific object of the present invention is to provide an improved hub assembly of the type described, which is simple and easy to use, and which is capable of positively and securely holding a reel for rotation therewith.

The foregoing and other objects of the present invention are achieved by a hub assembly for mounting tape supply reels for rotation on a selected axis which comprises a hub adapted to be mounted on a selected axis, a clamping element in the form of a resilient ring on the periphery of the hub, and, camming means and cam followers for expanding the resilient ring outwardly of the periphery of the hub so that the hub can exert pressure on a reel mounted on the hub.

Still other objects, advantages and features of the invention are disclosed or rendered obvious from the following detailed description which is to be considered together with the accompanying drawings, wherein.

In the several figures of the drawings like numerals are used to refer to like parts. The hub assembly in accordance with the present invention has particular utility for mounting magnetic tape supply reels in tape cassette loading machines and will be described in connection with its use in such machines. It will be understood, however, that the hub assembly of the present invention may be advantageously used for mounting various types of reels in various applications.

The magnetic tape cassette loading machine for which the hub assembly of the present invention is particularly designed, may take any of a variety of forms and the exact construction and relation of the various elements contained in the magnetic tape cassette loading machine are unimportant to the construction of the hub assembly of the present invention. However, the tape cassette loading machine will include a rotatable shaft, and a hub adapted to carry a tape supply reel. The rotatable shaft typically also will contain a plurality of locking pins for mating with keyways on the hub so that the hub will rotate in unison with the rotatable shaft. The tape reel generally is in the form of a short cylinder having a tape supporting outer surface with a diameter of nine inches and hub engaging inside surface with a diameter of six inches. If desired one or both sides edges of the reel may be formed with integral flanges for supporting the tape edges; however, flangeless reels generally are preferred for high speed tape winding operations.

Figure 1:
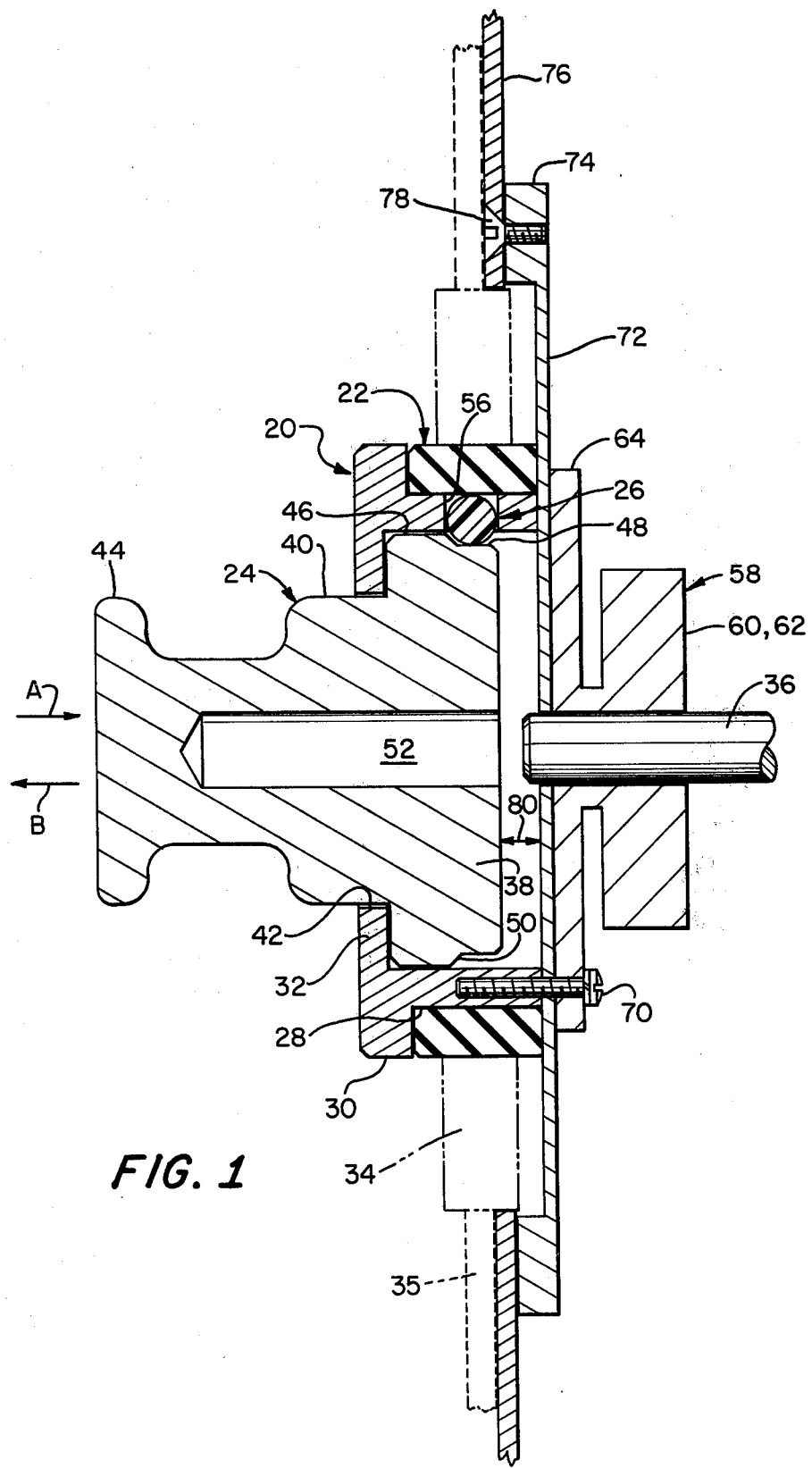
FIG. 1 is a vertical sectional view taken along the center line of a preferred form of hub assembly made in accordance with this invention.

The drawings show a preferred form of hub assembly made in accordance with the present invention. In the following description all members are formed of a rigid material such as a metal unless otherwise stated. Referring to FIG. 1, the hub assembly in accordance with the present invention essentially comprises three principal parts, a generally cylindrical hub member 20 adapted to be mounted for rotation on its axis, reel-locking means in the form of a resilient ring 22 carried on the periphery of hub member 20, and a reel-locking means actuator in the form of a cam member 24 and one or more cam followers as indicated generally at 26 for expanding resilient ring 22 outwardly of the periphery of the hub member. As seen in FIG. 1 hub member 20 is in the form of a short cylinder 28 having an integral outwardly extending annular flange 30 at one end and an integral inwardly extending flange 32 at the same end. Resilient ring 22 is mounted on the outer periphery of hub member 20, inboard of outwardly extending flange 30. Resilient ring 22 preferably is formed of an elastomeric material such as rubber. The purpose of making ring 22 out of a resilient material will become clear from the description following. Resilient ring 22, when mounted on the periphery of hub member 20, has a cross-sectional thickness which is substantially equal to the radial dimension of flange 30 measured from the outer surface of cylinder 28. Flange 30 has an outside diameter which is just slightly smaller than the inside diameter of the tape reel (shown in phantom at 34) which is to be mounted thereon. The hub assembly is adapted for rotation about its axis by means hereinafter described that secure it to a rotatable shaft 36 of a machine such as a cassette loading machine (not shown).

As noted already the reel-locking means actuator is adapted to expand resilient ring 22 outwardly of the periphery of hub 20. In this way ring 22 is made to exert a pressure on reel 34 and thereby to lock the reel to the hub member 20 for rotation with that hub. The actuator cam member 24 includes a generally cylindrical cam section 38 which is slidable mounted within the cylindrical section 28 of hub member 20, a reduced diameter cylindrical neck section 40 which is sized so as to extend through and be slidable axially along the circular opening formed by the inner edge 42 of flange 32, and a flanged handle section 44. As seen in FIG. 1, cam section 38 is somewhat shorter in length than the interior length of cylinder 28 and includes a first cylindrical surface 46 having an O.D. which is just slightly less than the I.D. of cylinder 28, a second cylindrical surface 48 of lesser O.D. dimension than surface 46, and a connecting frustoconical surface 50. Completing cam member 24 is a blind axial bore 52 formed in its rear or captured end and sized so as to be just slightly larger than and thereby slidably accomodate shaft 36.

Figure 3:
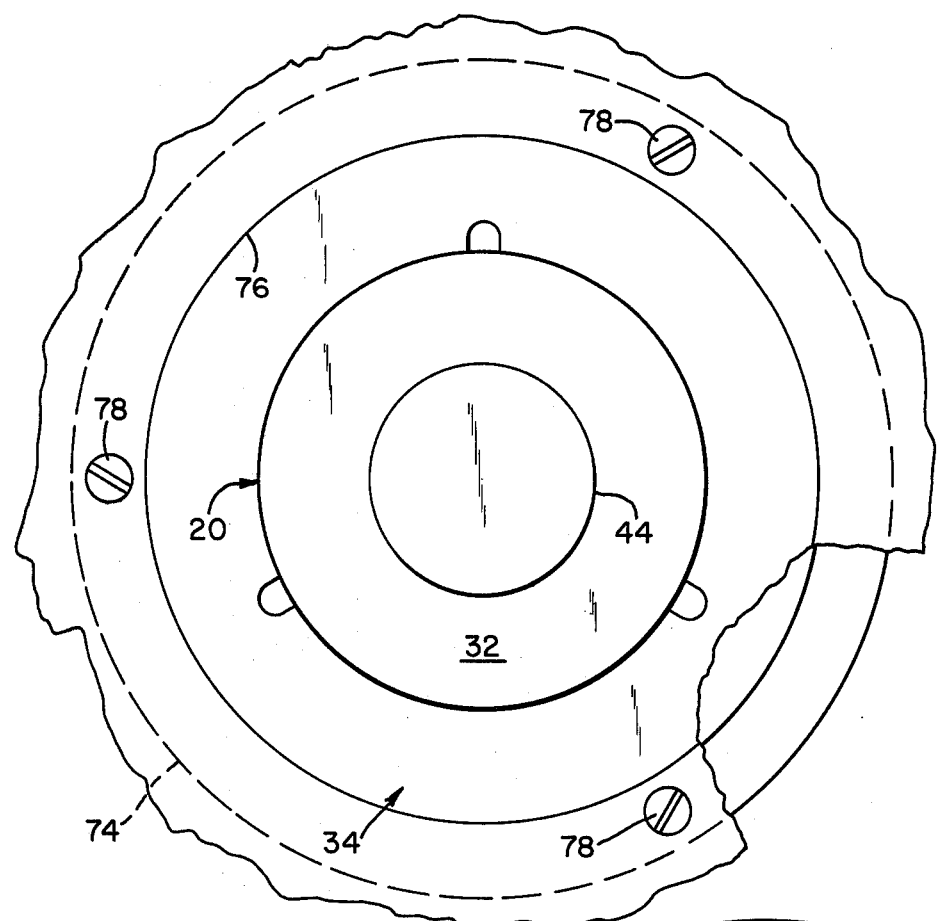
FIG. 3 is a front view in elevation, partly in section, of the hub assembly of FIG. 1.
Figure 2:
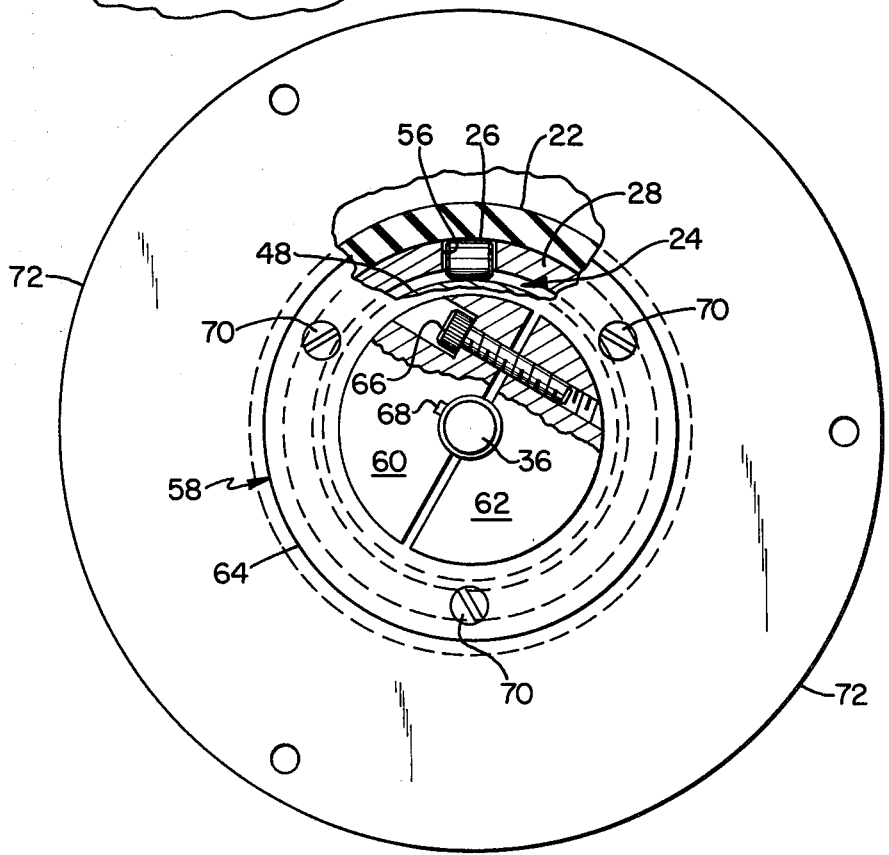
FIG. 2 is a rear view, in elevation, partly in section, of the hub assembly of FIG. 1.

Referring also to FIG. 2 of the drawings, the cam followers 26 which cooperate with cam section 38 to expand resilient ring 22 outwardly of the periphery of hub 20, whereby to exert pressure on a reel 34 mounted on the hub, may vary in member and shape. In the illustrated preferred embodiment of the present invention the cam followers 26 are in the form of short cylinders and the hub assembly comprises three such cam follower cylinders. Preferably but not necessarily the cam followers are positioned approximately symmetrically around the axis of the hub assembly. Although only one cam follower cylinder 26 is shown in the drawings for simplicity of illustration, it is to be understood that the hub assembly of FIGS. 1-3 has three such cam followers spaced apart by angles of approximately 120° around its axis of rotation. As seen in the drawings cam followers 26 are mounted in slots 56 formed through the wall of cylinder 28 of hub member 20. Slots 56 are located in a common plane extending at a right angle to the axis of cylinder 28 and are oriented so that their axes are aligned with chords of a circle concentric with the axis of cylinder 28. Cam follower cylinders 26 also have a diameter greater than the thickness of the wall of cylinder 28.

As seen in FIG. 1 cam follower cylinders 26 are captured between the outer cylindrical surface 48 of cam member 24 and the inner surface of resilient ring 22. Cam followers 26 and cylindrical surface 48 are dimensioned so that the two may contact one another without deflecting the resilient ring 22. Additionally cam followers 26 and cylindrical surface 46 are dimensioned so that when the cam member is moved inwardly, i.e. in the direction of arrow A, the cam followers will ride up sloping surface 50 and onto the outer cylindrical surface 46, whereby the cam follower cylinders are forced outwardly and thereby deflect resilient ring 22 outwardly of the periphery of the hub member 20. The reverse action occurs when cam member 24 is slid outwardly, i.e. in the direction of arrow B. Obviously, cam followers 26 are dimensioned so that the resulting radial expansion of resilient ring 22 will exert sufficient pressure on reel 34 to lock the latter to the hub assembly.

Hub member 20 is fixedly secured to a hub supporting member 58 which has a center hole permitting it to be mounted directly to shaft 36. As seen particular in FIG. 2 supporting member 58 comprises a split cylinder 60, 62 which is formed integral with a disk 64. The two parts 60 and 62 are forced toward each other in gripping relation with shaft 36 by a pair of cap screws 66, only one of which is shown. A keyway slot 68 is provided in one of the two parts 60 of the split cylinder for engaging with a key on shaft 36. Disk 64 is provided with holes to receive machine screws 70 which are received by threaded holes in the end of cylinder 28 of hub member 20 and serve to secure the hub member to its support 58. Hub member 20 may be secured directly to support 58. Preferably, however, it is spaced from its support 58 by a pancake adapter in the form of a disk 72 having an annular ridge 74, and a supply flange member in the form of an annular ring 76 which is concentrically secured to ridge 74 by screws 78. Screws 70 extend through suitable holes in disk 72.

Operation of the aforementioned assembly will now be described. In order to mount a reel on or remove a reel from the hub assembly in accordance with the present invention, cam member 24 is pulled outwardly, i.e. in the direction of arrow B as shown in FIG. 1. In this position the cam follower cylinders 26 rest against cylindrical surface 48 and the resilient ring 22 is left undeformed and thus assumes an outer radius substantially indentical to that of peripheral flange 30. This permits a tape reel 34 to be slid onto or off the hub assembly. To lock tape reel 34 in place on the hub it is a simple matter to push cam member 24 inwardly towards the pancake adapter, i.e. in the direction of arrow A, whereby cam follower cylinders 26 are engaged by sloping surface 50 and cammed outwardly enough to be engaged by cylindrical surface 46, whereby the cylinders 26 are held so that they protrude from cylinder 28 and deflect resilient ring 22 radially outward far enough to cause it to tightly grip the inner surface of reel 34. The ring 22 also acts to hold cam followers 26 in tight engagement with cam surface 46, thereby holding the cam member in its inner locking position. In this connection it should be noted that the cylinder 28 has a length such as to permit the stroke of the cam member (determined by the gap 80 between the cam member and disk 72 when the cam member is in its forward position against flange 32) to be long enough to assure that surface 46 will fully engage the cam followers. The locking action is essentially a snap action, with unlocking requiring merely a sharp pull on handle 44.

One skilled in the art will recognize that an advantage of a hub assembly made in accordance with the present invention is that the assembly has relatively few moving parts. Moreover, the hub assembly requires no special tools to lock or unlock the hub. Another advantage is that there is no lateral movement of the resilient ring 22 during locking operation, so that the reel, once positioned on the hub assembly, will not be laterally displaced when the hub assembly is locked. Thus the possibility that tape may be caught under the flange 76 of the pancake adapter is minimized. It should be noted also that the inner diameter of flange 76 is made slightly larger than the outer diameter of reel 34, whereby to allow space for the reel to be centered so that the supply of tape 35 wound thereon will be flat against and be supported by flange 76. The inner diameter of flange 76 is made close enough to the O.D. of reel 34 to prevent any loose tape end from passing between them and getting pinched.

It should be noted also that this invention is not limited in its application to hub assemblies for machines for handling magnetic tape and may be applied instead to machines for mounting other rotatable reels, spools, wheels, drums, etc. as, for example, reels of photographic film, spools of paper or textile filaments or wire, or drums carrying a recording medium. Still other applications will be obvious to persons skilled in the art. Therefore, as used in the following claims, the term "reel" is to be interpreted in a broad sense unless otherwise indicated.

Various changes may be made in the above described invention without departing from the scope of the invention. For example, cam followers 26 have been described as short cylinders. It will be understood, however, that the cam followers may be cylinders with tapered ends or may have some other rolling shaped configuration, e.g. round balls. Moreover, hub member 20 does not have to be flanged as at 30 to retain ring member 22. Instead, for example, ring 22 may include an inwardly directed flange for keying into a suitable recess formed in the periphery of cylinder 28. Also hub member 20 could have a flange similar to flange 30 at its rear end for further guiding ring 22. Still other changes and modifications will be obvious to one skilled in the art.

What is claimed is:

1. A hub assembly for releasably mounting a reel for rotation on a selected axis, said hub assembly comprising:
   a hub member having a hollow cylindrical section with inner and outer surfaces, a flange section extending radially inward of said cylindrical section, and a plurality of circumferentially-spaced openings in said cylindrical section;
   means attached to said hub member for supporting said hub member for rotation on said selected axis;
   a clamping element in the form of a resilient ring mounted on said hub member in surrounding and directly engaging relation with said outer surface;
   a plurality of cam followers for applying an expansion force to said resilient ring so that said ring can exert pressure on a reel mounted on said hub, each of said cam followers being movably disposed in one of said circumferentially spaced openings and being sized so that a portion thereof always protrudes from at least one of said inner and outer surfaces; and
   selectively operable actuator means for causing said cam-followers to apply an expansion force to said resilient ring, said actuator means comprising a cam member having a cam section and a neck section, said cam section comprising a first relatively small diameter cylindrical cam surface, a second relatively large diameter cylindrical cam surface spaced from said first cam surface along said axis, and a third frusto-conical cam surface connecting said first and second cylindrical cam surfaces, at least a portion of said neck section having a smaller diameter than said cam surfaces, said cam member being disposed so that said cam section is surrounded by said hollow cylindrical section and said portion of said neck section is surrounded by said flange section,
   said cam member being slidable along said axis relative to said hub member between (1) a release position in which said cam followers are aligned with said first cam surface and said resilient ring is unexpanded relative to said outer surface, and (2) a lock position in which said cam followers are engaged by said second cam surface and displaced outwardly of said axis so as to apply an expansion force to said resilient ring.

2. A hub assembly according to claim 1 wherein said first cam surface and said cam followers are dimensioned so that they may contact one another without deflecting the resilient ring, and said second cam surface is dimensioned so as to make a close sliding fit with said inner surface.

3. A hub assembly according to claim 1 wherein said flange is dimensioned so as to make a close sliding fit with said neck section.

4. A hub assembly according to claim 1 wherein said cam member has a radially-extending surface which is engaged by said flange when said cam member is in said release position.

5. A hub assembly according to claim 4 further including means attached to said hub member in position to be engaged by and stop said cam member when said cam member is moved to said lock position.

6. A hub assembly according to claim 1 wherein said means for supporting said hub member comprises a hub support member adapted to be mounted on and locked to a supporting rotatable shaft, and a disk attached to and disposed between said hub member and said hub support member, said disk having a diameter greater than said resilient ring.

7. A hub assembly according to claim 6 wherein said hub support member comprises a split cylinder adapted to be slipped over a supporting shaft, and means for compressing said split cylinder so as to cause said split cylinder to grip said shaft.

8. A hub assembly according to claim 6 wherein said hub member has a peripheral flange having a diameter not exceeding the outside diameter of said resilient ring when said cam member is in its release position, whereby a reel may be slipped over said peripheral flange in position to be gripped by said resilient ring when said cam member is moved to said lock position.

9. A hub assembly according to claim 8 wherein said disk has a ridge on the side thereof facing said resilient ring, and further including a flange member attached to said ridge and disposed in overlapping radial spaced relation with said resilient ring.

10. A hub assembly according to claim 1 wherein said cam member comprises a handle attached to said neck section remote from said cam section, and said cam section is arranged so that said second cam surface is between said neck section and said first cam surface.

11. A hub assembly according to claim 10 wherein said handle has a maximum outer diameter less than the inside diameter of said flange section, whereby said cam member may be separated from said hub member by withdrawing said handle through the interior space of said hub member.

12. A hub assembly according to claim 1 wherein said cam followers are cylinders oriented so that their axes are aligned with chords of a circle concentric with said hollow cylindrical section.

* * * * *